US00RE44845E

(19) United States
(12) Reissued Patent
Oksman et al.

(10) Patent Number: US RE44,845 E
(45) Date of Reissued Patent: Apr. 15, 2014

(54) APPARATUS COMPRISING A SLIDING DISPLAY PART

(71) Applicant: Nokia Corporation, Espoo (FI)

(72) Inventors: Markku Oksman, Turku (FI); Tomas Ivaskevicius, Helsinki (FI); Kim Heikkinen, Helsinki (FI); Tomi Kapiainen, Helsinki (FI); Jenni Vaananen, Helsinki (FI); Kaisa Ruotsalainen, Helsinki (FI)

(73) Assignee: Nokia Corporation, Espoo (FI)

(21) Appl. No.: 13/833,408

(22) Filed: Mar. 15, 2013

Related U.S. Patent Documents

Reissue of:
(64) Patent No.: 8,195,254
Issued: Jun. 5, 2012
Appl. No.: 12/645,189
Filed: Dec. 22, 2009

(51) Int. Cl.
*H04W 88/02* (2009.01)

(52) U.S. Cl.
USPC ..... 455/575.3

(58) Field of Classification Search
None
See application file for complete search history.

(56) References Cited

U.S. PATENT DOCUMENTS

| | | | | |
|---|---|---|---|---|
| 6,608,996 | B1 | 8/2003 | Laurikka et al. | |
| 6,643,124 | B1 | 11/2003 | Wilk | |
| 6,927,908 | B2 | 8/2005 | Stark | |
| 7,706,556 | B2 * | 4/2010 | Qi et al. | 381/315 |
| 8,482,484 | B2 * | 7/2013 | Yamazaki et al. | 345/4 |
| 2002/0196400 | A1 | 12/2002 | Hashimoto et al. | |
| 2004/0204126 | A1 | 10/2004 | Reyes et al. | |
| 2007/0060220 | A1 * | 3/2007 | Hsu | 455/575.4 |
| 2007/0155450 | A1 * | 7/2007 | Juan et al. | 455/575.4 |
| 2010/0062810 | A1 * | 3/2010 | Griffin | 455/566 |
| 2010/0110010 | A1 | 5/2010 | Choi | |
| 2010/0177044 | A1 * | 7/2010 | Plestid | 345/167 |
| 2010/0281431 | A1 * | 11/2010 | Kano et al. | 715/835 |

FOREIGN PATENT DOCUMENTS

| | | |
|---|---|---|
| KR | 10-2003-0074628 | 9/2003 |
| KR | 10-2009-0013040 | 2/2009 |
| WO | WO 02/42838 | 5/2002 |

OTHER PUBLICATIONS

PCT International Search Report of PCT/FI2010/050769—Date of Completion of Search: Jan. 19, 2011, 4 pages.

* cited by examiner

*Primary Examiner* — Diane Mizrahi
(74) *Attorney, Agent, or Firm* — Locke Lord LLP

(57) ABSTRACT

An apparatus including a first part slidingly attached to a second part, the first part having a main display and a secondary display, wherein the first part has a surface providing the main display, and wherein the surface bends or folds forming a side or side surface that provides the secondary display.

74 Claims, 4 Drawing Sheets

APPARATUS COMPRISING A SLIDING DISPLAY PART

Matter enclosed in heavy brackets [ ] appears in the original patent but forms no part of this reissue specification; matter printed in italics indicates the additions made by reissue.

TECHNICAL FIELD

The present invention relates to apparatuses having a first part slidingly attached to a second part, where at least the first part has a display.

BACKGROUND ART

Currently, the mobile handheld devices in the market are increasingly used for different functions, for example, browsing in the internet, making phone calls, viewing different media content, listening to music or radio, preparing presentations or documents, sending email, as well as using clock and calendar functions. The different functions place various requirements on the user interface of the devices. One common requirement is a big display which is easy to operate.

SUMMARY

According to a first example aspect of the invention there is provided an apparatus comprising:

a first part slidingly attached to a second part, the first part having a main display and a secondary display, wherein the first part has a surface providing the main display, and wherein the surface bends or folds forming a side or side surface that provides the secondary display.

The surface providing the main display may form a top surface which together with the side surface forms an outer surface of the first part or the apparatus. The side surface may form a part of the first mentioned surface. The top surface and the side surface may be separate surfaces attached together. In certain example embodiments, the first part comprises of the apparatus comprises an edge, wherein the surface providing the main display goes over the edge forming a side surface providing the secondary display.

In certain example embodiments, both the main display and the secondary display are touch displays. In certain example embodiments, the surface is mostly covered by the displays; in certain example embodiments, entirely covered by the displays.

In certain example embodiments, the apparatus is configured to show an icon or a link to a content on the secondary display and to show the content on the main display. In certain example embodiments, the apparatus is configured to show at least one shortcut to an application or a plurality of shortcuts to applications on the secondary display, and to activate or show in response to pressing the shortcut an application or application window on the main display.

In certain example embodiments, the apparatus is configured to show an icon or a link to a content on the secondary display and to activate the content on the main display from the icon or link.

In certain example embodiments, the apparatus comprises a set of control buttons on the secondary display, and the apparatus is configured to control information on the main display based on input received from the user via the control buttons. Input from the user may be generally received from the user by detecting a press or presses of the user on the display(s). In certain example embodiments, the user does not even have to touch the display, but a mere movement near the display is sensed.

In certain example embodiments, the apparatus is configured to transfer information between the main display and the secondary display as controlled by a user. In certain example embodiments, the apparatus is configured to provide a user with a function in which the user drags information from one of the main and secondary displays to the other one. The information may comprise content, icons, shortcuts, or similar.

In certain example embodiments, the main display and the secondary display form one continuous bigger display. The main display may then form a main display area and the secondary display a secondary display area of the combined display.

In certain example embodiments, the first part is a sliding lid. The lid part may have a main surface having the main display and a side surface having the secondary display. In certain example embodiments, the main display is a planar display and the secondary display is either a planar or a curved display.

In certain example embodiments, the apparatus comprises the second part which is a base (or bottom) part. The second part may have an input device, such as a full keyboard, a limited keypad or a virtual keyboard operating as display when needed (that is, a virtual keyboard display), which is revealed upon sliding the first part in relation to the second part. The apparatus may be a side slide device.

In certain example embodiments, a cross section of the first part is a trapezoid, the main display being on the top plane of the trapezoid and the secondary display being on at least one of the side planes. In certain example embodiments, the surface bends or folds over an edge towards the outer edge of the first part forming the side which is of a wedge shape providing the secondary display.

In certain example embodiments, the apparatus is configured to show different content in different displays. In certain other example embodiments, the apparatus is configured to show same content on both displays.

In certain example embodiments, a mobile device has two slidable parts: a lid part and a base part. The lid part has a planar main surface and a slope. The slope may surround the main surface entirely or in part. The planar main surface provides a main display. The main display is extended over a border or edge(s) of the main surface onto the slope. The slope therefore provides a secondary display which may be a part of the main display or a separate display. The lid part may be a full display, the main display extended over the edges.

In certain example embodiments, the apparatus is configured to allow an individual user to move display content from the main display to the secondary display, for example icons. When for example an e-mail message arrives, the apparatus may be configured to change the color of the icon, make it to blink, etc. In certain example embodiments, the first part has a triangular wedge shape. The two displays may work independently of each other.

Due to the secondary display, the user does not always have to use the main display for viewing and modifying content, but instead she/he may use the secondary display on the edge for viewing and editing. In certain example embodiments, the apparatus is configured to provide the user with a function of drag and drop content from the main display to the secondary display.

The apparatus may be an electrical device. It may be a mobile handheld device, a mobile communication device or a smaller computing device. It may be a mobile terminal, mobile communicator, a PDA device, a mobile phone, or an e-book, or similar.

In another example aspect of the invention, there is provided a computer program embodied on a computer readable medium comprising computer executable program code which, when executed by at least one processor of an apparatus comprising a first part slidingly attached to a second part, the first part having a main display and a secondary display, the first part having a surface providing the main display, and wherein the surface bends or folds forming a side or side surface that provides the secondary display, causes the apparatus to perform:

operating the apparatus and controlling the use of the main and the secondary display.

According to yet another example aspect of the invention there is provided a memory medium carrying the computer program of the foregoing example aspect. The memory medium may be a digital data storage such as a data disc or diskette, optical storage, magnetic storage, holographic storage, phase-change storage (PCM) or opto-magnetic storage. The memory medium may be formed into a device without other substantial functions than storing memory or it may be formed as part of a device with other functions, including but not limited to a memory of a computer, a chip set, and a sub assembly of an electronic device.

Correspondingly, an example aspect implementing a method for controlling the use of the main and secondary display may be provided. Accordingly, in accordance with yet another example aspect of the invention, there is provided a method comprising:

operating an apparatus comprising a first part slidingly attached to a second part, the first part having a main display and a secondary display, the first part having a surface providing the main display, and wherein the surface bends or folds forming a side or side surface that provides the secondary display; and controlling the use of the main and the secondary display.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
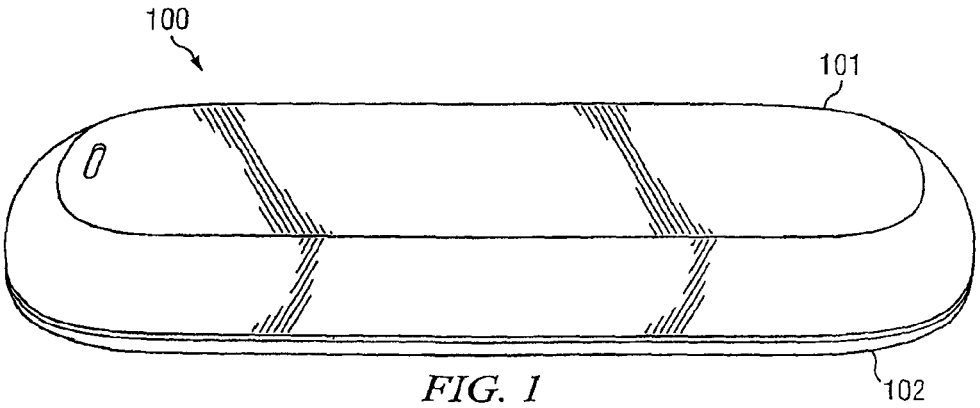
FIG. 1 shows a schematic drawing of an apparatus according to an example embodiment.

FIG. 1 shows a schematic drawing of an apparatus according to an example embodiment. In this example, the apparatus 100 is a mobile handheld electronic device. It comprises a first part 101 and a second part 102 slidingly attached to each other.

Figure 2:
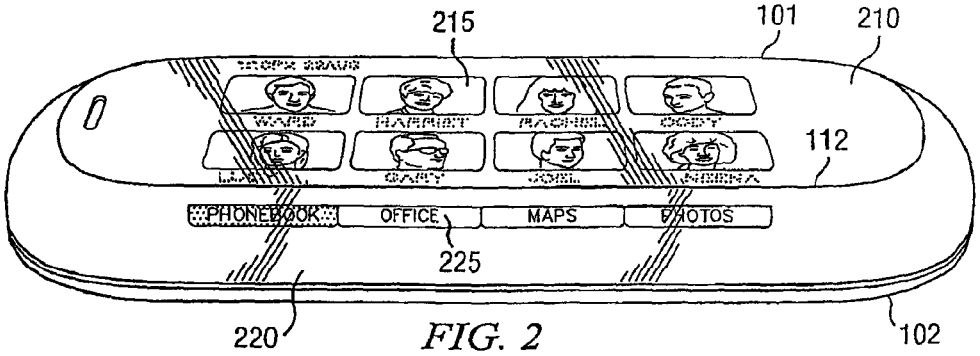
FIG. 2 shows a schematic drawing of the apparatus of FIG. 1 in a first operating state according to an example embodiment.

FIG. 2 shows a schematic drawing of the apparatus 100 in a first operating state according to an example embodiment. The first part 101 in this example is a lid part comprising a surface 210 that provides a main display 215. In this example embodiment, the surface 210 is planar. The surface 210 folds over a border or edge 112 towards an outer edge of the first part forming a side (or slope) 220 providing a secondary display 225. Alternatively, the border or edge 112 may be less sharp so that the surface 210 merely bends towards the outer edge forming the side 220 providing the secondary display 225. Depending on the implementation, the side 220 and the secondary display 225 are either planar or curved. In this example, both the main display 215 and the secondary display on the side 220 are touch displays. It is to be noted that although only a top part of the secondary display 225 is in use in the operating state shown in FIG. 2, the secondary display 225 can, in fact, extend all the way to the outer edge of the first part 101.

In certain example embodiments, the main display 215 and the secondary display 225 cover the whole lid part 101. In other example embodiments, the lid part 101 can, in addition to the displays, comprise peripheral areas surrounding the displays, or on the left and/or right and/or top and/or bottom side of the display(s) only. On such a peripheral area can be located for example a microphone, speakers, certain buttons, additional display elements, indicator lights, or similar.

In certain example embodiments, the apparatus provides the user with the function of controlling, from the secondary display 225, information content in the main display 215. In the example shown in FIG. 2, the main display 215 shows a content to the user as selected by selection buttons on the secondary display 225. In this example embodiment, a plurality of selection buttons (PHONEBOOK, OFFICE, MAPS and PHOTOS) is visible on the secondary display 225. The user has activated the PHONEBOOK function. Accordingly, the user's contacts (for example, names and faces) are shown on the main display 215.

Figure 3:
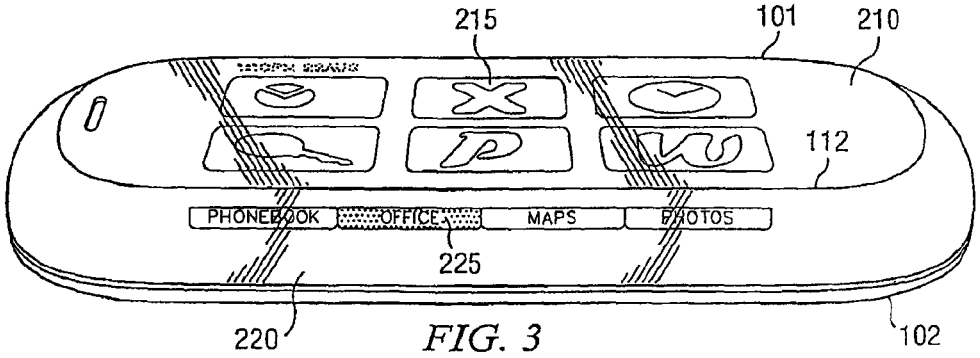
FIG. 3 shows a schematic drawing of the apparatus of FIG. 1 in a second operating state according to an example embodiment.

FIG. 3 shows a schematic drawing of the apparatus 100 in a second operating state according to an example embodiment. In this example, the user has activated the OFFICE selection button. Accordingly, different icons of office applications or links to a selection of applications (such as a word processing application, a scheduling application, and corresponding applications) are shown on the main display 215.

Figure 4:
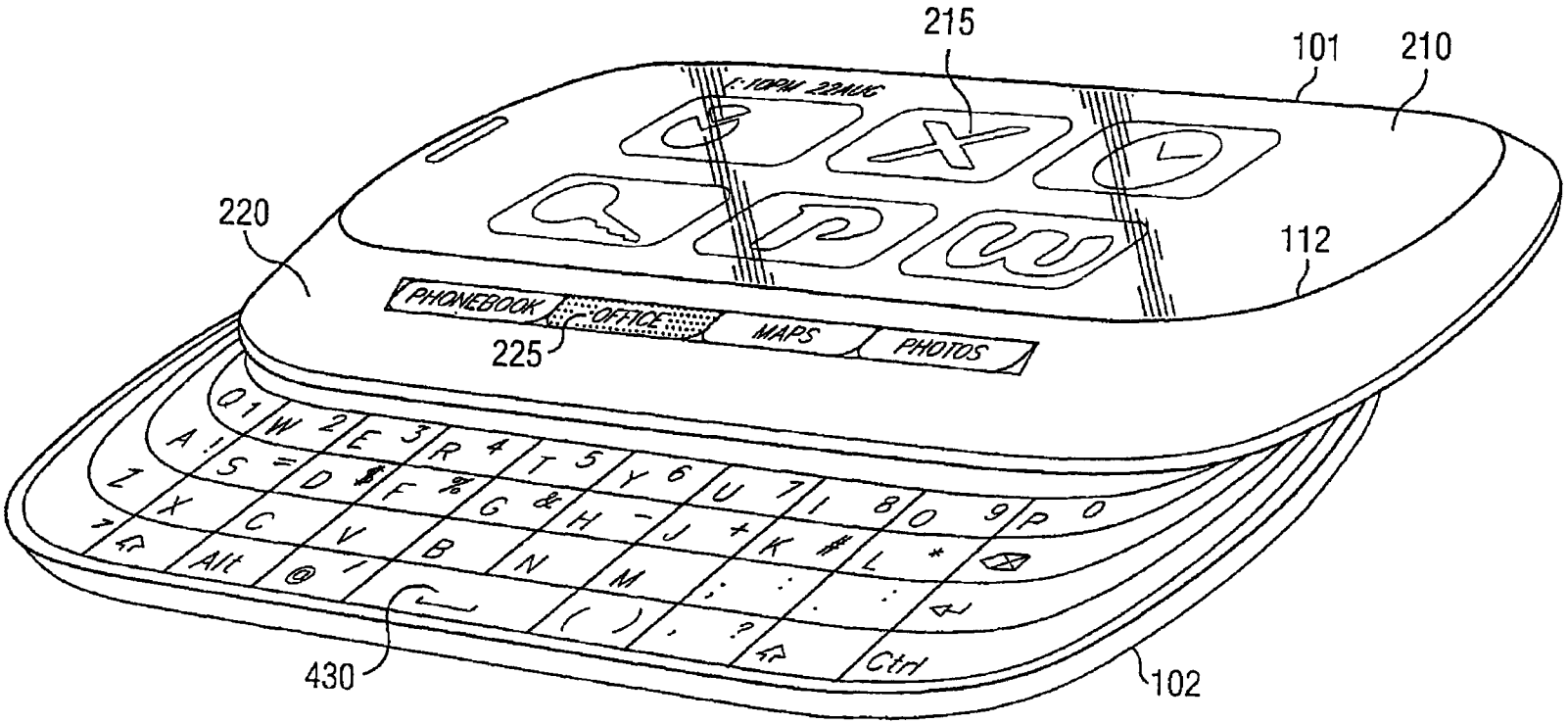
FIG. 4 shows a schematic drawing of the apparatus of FIG. 1 with a slide open in a third operating state according to an example embodiment.

FIG. 4 shows a schematic drawing of the apparatus 100 with a slide open in a third operating state according to an example embodiment. The third operating state otherwise corresponds to the second operating state except that while the apparatus 100 in the second operating state was in a closed configuration, the apparatus 100 in the third operating state is in a slide open configuration revealing an input device, such as the full keyboard (or a virtual keyboard display) 430 of the second part (or base part) 102. The input device is revealed upon sliding the lid part 101 in relation to the second part 102 into the slide open configuration. It may be a qwerty keyboard or a smaller keypad. For the purpose of the slide function, any suitable conventional side slide mechanism can be used.

Figure 5:
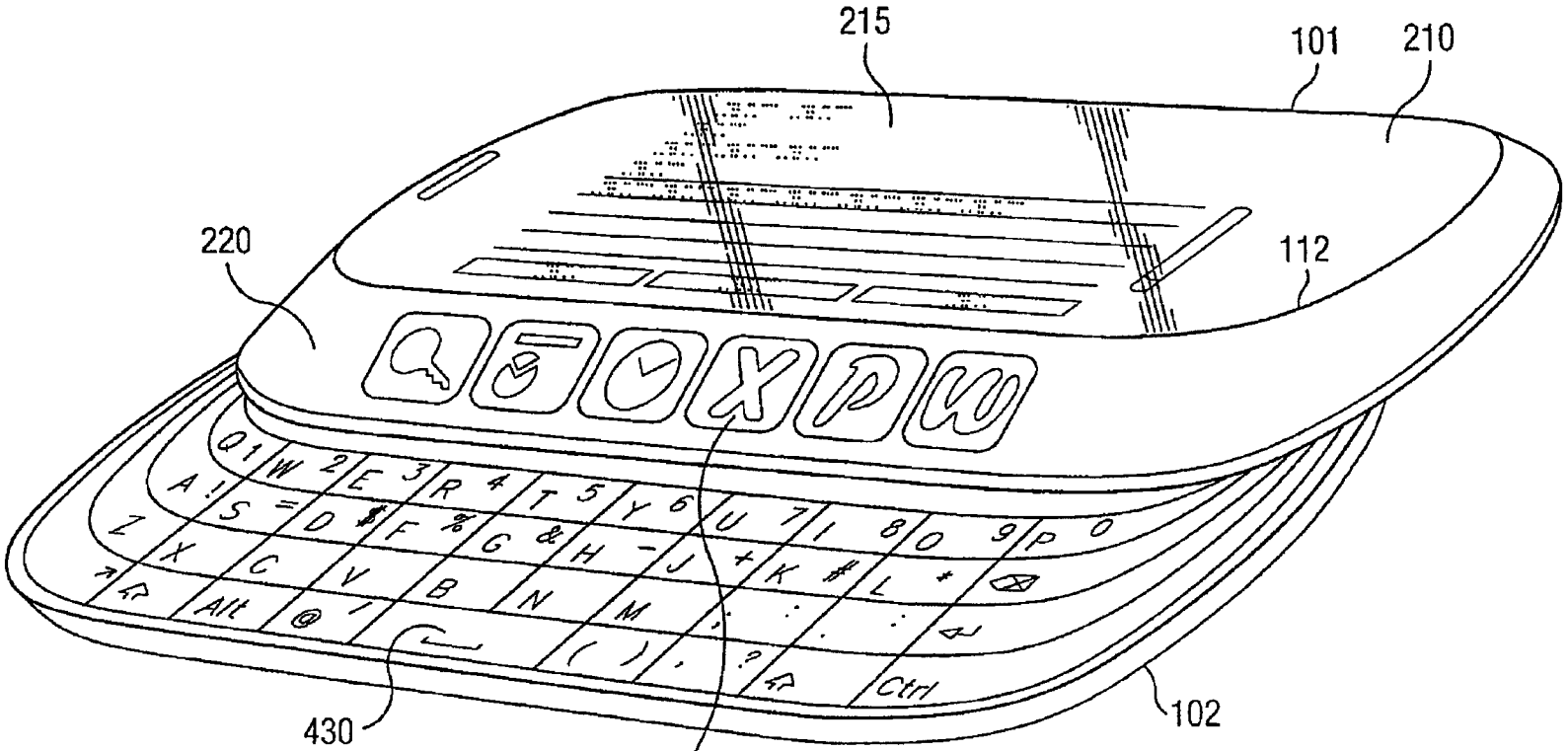
FIG. 5 shows a schematic drawing of the apparatus of FIG. 1 with the slide open in a fourth operating state according to an example embodiment.

FIG. 5 shows a schematic drawing of the apparatus 100 with the slide open in a fourth operating state according to an example embodiment. In certain example embodiments, the apparatus is configured to allow an individual user to move display content from the main display 215 to the secondary display 225, for example icons as shown in FIG. 5. The user has dragged and dropped icons shown in the main display 215 in the third operating state to the secondary display 225 in the fourth operating state. The drag and drop function (and other functions which concern moving display content from one display to another one, and similar tasks) can be achieved by touching the display(s) concerned with one's finger or a stylus, or by sliding one's finger or the stylus on the display(s) concerned to a desired direction, or otherwise, for example by a suitable clicking scheme (such as a double or triple click), or by using the input device 430. In certain example embodiments, the user does not even have to touch the display, but a mere movement near the display is sensed.

In certain example embodiments, the user can activate applications on the main display 215 for example by touching or clicking the corresponding icon on the secondary display 225. FIG. 5 shows an email application activated on the main display 215. In the slide open configuration, the user may use the input device 430 to write onto the main display 215 (such as to write an email, or to write in a word processing application, or similar).

In certain example embodiments, icons on the secondary display 225 are used to indicate certain occurrences. For example, when an email message arrives, an email icon on the secondary display can be arranged to change color, to blink, etc.

In certain example embodiments, the main display 215 and the secondary display 225 are separate displays having a gap there between. In certain other example embodiments, the main display 215 and the secondary display 225 form a combined continuous display. The main display 215 may then form a main display area and the secondary display 225 a secondary display area of the combined display. In both cases the displays 215 and 225 may operate either dependently or independently of each other.

In certain example embodiments, the apparatus is configured to provide the user with different appearances. In certain example embodiments, the apparatus is configured so that the user can customize the appearance of the apparatus according to her/his own preferences. Via operating one or more of the displays 215 and 225, the user is enabled to change the information content or appearance of any particular display 215 and/or 225. FIGS. 2, 3 and 5, for example, show slightly different appearances.

Figure 6:
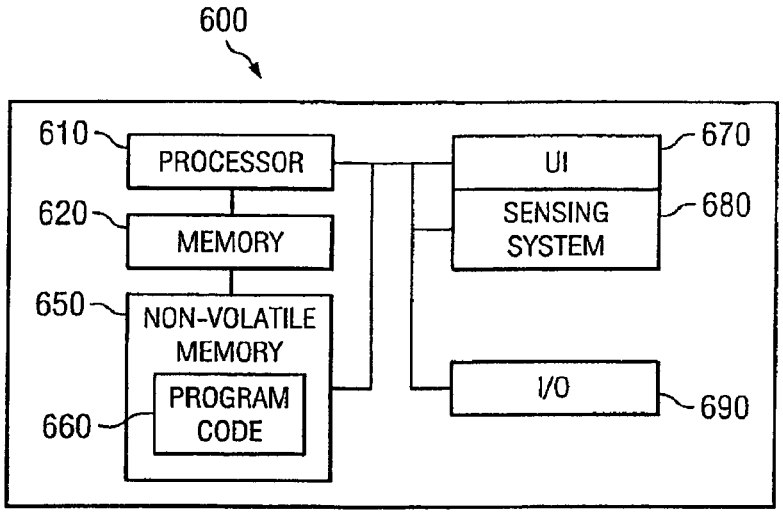
FIG. 6 shows an example block diagram of an apparatus according to certain example embodiments.

FIG. 6 shows an example block diagram of an apparatus 600 according to certain example embodiments of the invention. The apparatus 600 is suitable for functioning as the apparatus 100 described in the foregoing.

The apparatus 600 comprises at least one non-volatile memory 650 configured to store computer programs or software comprising computer program code 660. The apparatus 600 further comprises at least one processor 610 for controlling the operation of the apparatus 600 using the computer program code 660, a work memory 620 for running the computer program code 660 by the at least one processor 610, and an input/output system (or communication unit) 690 for communicating with other entities or apparatuses. The apparatus 600 comprises a user interface 670 including at least the displays described in the foregoing. The apparatus further comprises a sensing system 680 in connection with the displays. The sensing system 680 senses or detects touches, clicking, and finger or stylus movements on the displays in the manner known us such to the skilled person. In certain example embodiments, the user does not even have to touch the display, but a mere movement near the display is sensed. The sensing system 680 is connected to the at least one processor 610. The at least one processor 610 can control the operation of the sensing system 680 in accordance with the program code 660.

The at least one processor 610 may be a master control unit (MCU). Alternatively, the at least one processor 610 may be a microprocessor, a digital signal processor (DSP), an application specific integrated circuit (ASIC), a field programmable gate array, a microcontroller or a combination of such elements.

The apparatus 600 is generally operated by the at least one processor 610 based on the program code 660. As to the operations of the embodiments of the invention, when the computer program code 660 is executed by the at least one processor 610, and the at least one processor 610 receives from the sensing means 680 input indicative of touches on one or more displays, this causes the apparatus 600 to implement operations in different embodiments. These operations can, among other things, comprise controlling content or information on one or more of the displays of the apparatus based on a detected touch action or detected touch actions, and other operations as described or referenced in the foregoing.

Furthermore, when the computer program code 660 is executed by the at least one processor 610, this causes the apparatus 600 to implement functions in which the main display and/or the secondary displays are used to indicate different occurrences to the user.

Figure 7:
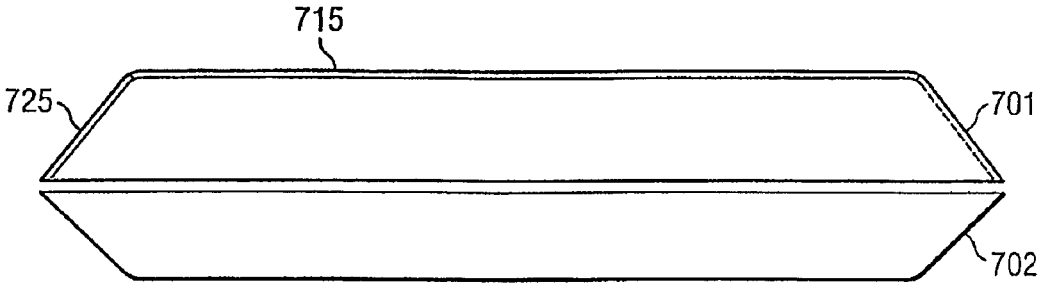
FIG. 7 shows an example cross section of an apparatus according to certain example embodiments.

The shape of the apparatus in the various example embodiments depends on the implementation. FIG. 7 shows an example cross section of an apparatus according to certain example embodiments. The apparatus can be an apparatus of the type similar to the apparatus 100 described in the foregoing, and the cross section presents an example cross section taken from a middle area of the apparatus. In the example shown in FIG. 7, the cross section of the first part 701 generally is a trapezoid, a main display 715 being on a top plane of the trapezoid and a secondary display 725 being on at least one of the side planes. In the example shown in FIG. 7, the secondary display 725 is on the side plane on the left hand side of the cross section. The dotted line close to the side plane on the right hand side indicates the possibility to include the secondary display 725 also on that side. Alternatively, the secondary display 725 can completely circulate the main display 715 at the sides so as aid in the formation of the first part 701 to be a full display, wherein the first part 701 in its visible parts is practically entirely covered by the display(s).

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An electronic apparatus comprising:

a first part slidingly attached to a second part, the first part having a surface that provides a main display and that bends forming a side surface that provides a secondary display.

2. An apparatus according to claim 1, wherein both the main display and the secondary display comprise touch displays.

3. An apparatus according to claim 1, wherein the apparatus is configured to show one of an icon and a link to a content on the secondary display and to show the content on the main display.

4. An apparatus according to claim 1, wherein the apparatus is configured to show one of an icon and a link to a content on the secondary display and to activate the content on the main display from said one of an icon and a link.

5. An apparatus according to claim 1, wherein the apparatus comprises a set of control buttons on the secondary display, and wherein the apparatus is configured to control information on the main display based on input received from a user via the control buttons.

6. An apparatus according to claim 1, wherein the apparatus is configured to transfer information between the main display and the secondary display as controlled by a user.

7. An apparatus according to claim 1, wherein the main display and the secondary display together comprise one continuous larger display.

8. An apparatus according to claim 1, wherein an outer surface of the apparatus comprises mostly the displays.

9. An apparatus according to claim 1, wherein the first part comprises a sliding lid.

10. An apparatus according to claim 1, wherein a cross section of the first part comprises a trapezoid, the main display being on a top plane of the trapezoid and the secondary display being on at least one side plane of the trapezoid.

11. An apparatus according to claim 1, wherein the surface bends over an edge towards an outer edge of the first part forming the side surface which comprises a wedge shape for providing the secondary display.

12. An apparatus according to claim 1, wherein the apparatus comprises a mobile handheld electronic device.

13. A computer program embodied on a non-transitory computer readable medium comprising computer executable program code which, when executed by at least one processor of an electronic apparatus comprising a first part slidingly attached to a second part, the first part having a surface that provides a main display and that bends forming a side surface that provides a secondary display, causes the apparatus to perform:

operating the apparatus and controlling use of the main display and the secondary display.

14. An electronic apparatus comprising:

a first part slidingly attached to a second part, the first part having a surface that provides a main display and that folds forming a side that provides a secondary display.

15. An apparatus according to claim 14, wherein both the main display and the secondary display comprise touch displays.

16. An apparatus according to claim 14, wherein the apparatus is configured to show one of an icon and a link to a content on the secondary display and to show the content on the main display.

17. An apparatus according to claim 14, wherein the apparatus is configured to show one of an icon and a link to a content on the secondary display and to activate the content on the main display from said one of an icon and a link.

18. An apparatus according to claim 14, wherein the apparatus comprises a set of control buttons on the secondary display, and wherein the apparatus is configured to control information on the main display based on input received from a user via the control buttons.

19. An apparatus according to claim 14, wherein the apparatus is configured to transfer information between the main display and the secondary display as controlled by a user.

20. An apparatus according to claim 14, wherein the main display and the secondary display together comprise one continuous larger display.

21. An apparatus according to claim 14, wherein an outer surface of the apparatus comprises mostly the displays.

22. An apparatus according to claim 14, wherein the first part comprises a sliding lid.

23. An apparatus according to claim 14, wherein a cross section of the first part comprises a trapezoid, the main display being on a top plane of the trapezoid and the secondary display being on at least one side plane of the trapezoid.

24. An apparatus according to claim 14, wherein the surface folds over an edge towards an outer edge of the first part forming the side which comprises a wedge shape for providing the secondary display.

25. An apparatus according to claim 14, wherein the apparatus comprises a mobile handheld electronic device.

26. A computer program embodied on a non-transitory computer readable medium comprising computer executable program code which, when executed by at least one processor of an electronic apparatus comprising a first part slidingly attached to a second part, the first part having a surface that provides a main display and that folds forming a side that provides a secondary display, causes the apparatus to perform:

operating the apparatus and controlling use of the main display and the secondary display.

*27. An electronic apparatus comprising: a surface that provides a main display and that bends towards an outer edge of the apparatus forming a curved side surface that provides a secondary display.*

*28. An apparatus according to claim 27, wherein both the main display and the secondary display comprise touch displays.*

*29. An apparatus according to claim 27, wherein the apparatus is configured to show one of an icon and a link to a content on the secondary display and to show the content on the main display.*

*30. An apparatus according to claim 27, wherein the apparatus is configured to show one of an icon and a link to a content on the secondary display and to activate the content on the main display from said one of an icon and a link.*

*31. An apparatus according to claim 27, wherein the apparatus comprises a set of control buttons on the secondary display, and wherein the apparatus is configured to control information on the main display based on input received from a user via the control buttons.*

*32. An apparatus according to claim 27, wherein the apparatus is configured to transfer information between the main display and the secondary display as controlled by a user.*

*33. An apparatus according to claim 27, wherein the main display and the secondary display together comprise one continuous larger display.*

*34. An apparatus according to claim 27, wherein the surface of the apparatus comprises mostly the displays.*

*35. An apparatus according to claim 27, wherein a cross section of the apparatus comprises a trapezoid, the main*

*display being on a top plane of the trapezoid and the secondary display being on at least one side plane of the trapezoid.*

*36. An apparatus according to claim 27, wherein the surface bends over an edge towards an outer edge of the apparatus forming the side surface which comprises a wedge shape for providing the secondary display.*

*37. An apparatus according to claim 27, wherein the apparatus comprises a mobile handheld electronic device.*

*38. A computer program embodied on a non-transitory computer readable medium comprising computer executable program code which, when executed by at least one processor of an electronic apparatus, the apparatus comprising a surface that provides a main display and that bends towards an outer edge of the apparatus forming a curved side surface that provides a secondary display, causes the apparatus to perform:*

*operating the apparatus and controlling use of the main display and the secondary display.*

*39. An electronic apparatus comprising: a surface that provides a main display and that folds over a border or an edge towards an outer edge of the apparatus forming a curved side surface that provides a secondary display.*

*40. An apparatus according to claim 39, wherein both the main display and the secondary display comprise touch displays.*

*41. An apparatus according to claim 39, wherein the apparatus is configured to show one of an icon and a link to a content on the secondary display and to show the content on the main display.*

*42. An apparatus according to claim 39, wherein the apparatus is configured to show one of an icon and a link to a content on the secondary display and to activate the content on the main display from said one of an icon and a link.*

*43. An apparatus according to claim 39, wherein the apparatus comprises a set of control buttons on the secondary display, and wherein the apparatus is configured to control information on the main display based on input received from a user via the control buttons.*

*44. An apparatus according to claim 39, wherein the apparatus is configured to transfer information between the main display and the secondary display as controlled by a user.*

*45. An apparatus according to claim 39, wherein the main display and the secondary display together comprise one continuous larger display.*

*46. An apparatus according to claim 39, wherein the surface of the apparatus comprises mostly the displays.*

*47. An apparatus according to claim 39, wherein a cross section of the apparatus comprises a trapezoid, the main display being on a top plane of the trapezoid and the secondary display being on at least one side plane of the trapezoid.*

*48. An apparatus according to claim 39, wherein the surface folds over an edge towards an outer edge of the apparatus forming the side which comprises a wedge shape for providing the secondary display.*

*49. An apparatus according to claim 39, wherein the apparatus comprises a mobile handheld electronic device.*

*50. A computer program embodied on a non-transitory computer readable medium comprising computer executable program code which, when executed by at least one processor of an electronic apparatus comprising a surface that provides a main display and that folds over a border or an edge towards an outer edge of the apparatus forming a curved side surface that provides a secondary display, causes the apparatus to perform:*

*operating the apparatus and controlling use of the main display and the secondary display.*

*51. An electronic apparatus comprising: a surface that provides a main display and that bends towards an outer edge of the apparatus forming a planar side surface that is sloped relative to the main display, the side surface providing a secondary display.*

*52. An apparatus according to claim 51, wherein both the main display and the secondary display comprise touch displays.*

*53. An apparatus according to claim 51, wherein the apparatus is configured to show one of an icon and a link to a content on the secondary display and to show the content on the main display.*

*54. An apparatus according to claim 51, wherein the apparatus is configured to show one of an icon and a link to a content on the secondary display and to activate the content on the main display from said one of an icon and a link.*

*55. An apparatus according to claim 51, wherein the apparatus comprises a set of control buttons on the secondary display, and wherein the apparatus is configured to control information on the main display based on input received from a user via the control buttons.*

*56. An apparatus according to claim 51, wherein the apparatus is configured to transfer information between the main display and the secondary display as controlled by a user.*

*57. An apparatus according to claim 51, wherein the main display and the secondary display together comprise one continuous larger display.*

*58. An apparatus according to claim 51, wherein the surface of the apparatus comprises mostly the displays.*

*59. An apparatus according to claim 51, wherein a cross section of the apparatus comprises a trapezoid, the main display being on a top plane of the trapezoid and the secondary display being on at least one side plane of the trapezoid.*

*60. An apparatus according to claim 51, wherein the surface bends over an edge towards an outer edge of the apparatus forming the side surface which comprises a wedge shape for providing the secondary display.*

*61. An apparatus according to claim 51, wherein the apparatus comprises a mobile handheld electronic device.*

*62. A computer program embodied on a non-transitory computer readable medium comprising computer executable program code which, when executed by at least one processor of an electronic apparatus, the apparatus comprising a surface that provides a main display and that bends towards an outer edge of the apparatus forming a planar side surface that is sloped relative to the main display, the side surface providing a secondary display, causes the apparatus to perform:*

*operating the apparatus and controlling use of the main display and the secondary display.*

*63. An electronic apparatus comprising: a surface that provides a main display and that folds over a border or an edge towards an outer edge of the apparatus forming a planar side surface that is sloped relative to the main display, the side surface providing a secondary display.*

*64. An apparatus according to claim 63, wherein both the main display and the secondary display comprise touch displays.*

*65. An apparatus according to claim 63, wherein the apparatus is configured to show one of an icon and a link to a content on the secondary display and to show the content on the main display.*

*66. An apparatus according to claim 63, wherein the apparatus is configured to show one of an icon and a link to a content on the secondary display and to activate the content on the main display from said one of an icon and a link.*

*67. An apparatus according to claim 63, wherein the apparatus comprises a set of control buttons on the secondary*

*display, and wherein the apparatus is configured to control information on the main display based on input received from a user via the control buttons.*

*68. An apparatus according to claim 63, wherein the apparatus is configured to transfer information between the main display and the secondary display as controlled by a user.*

*69. An apparatus according to claim 63, wherein the main display and the secondary display together comprise one continuous larger display.*

*70. An apparatus according to claim 63, wherein the surface of the apparatus comprises mostly the displays.*

*71. An apparatus according to claim 63, wherein a cross section of the apparatus comprises a trapezoid, the main display being on a top plane of the trapezoid and the secondary display being on at least one side plane of the trapezoid.*

*72. An apparatus according to claim 63, wherein the surface folds over an edge towards an outer edge of the apparatus forming the side which comprises a wedge shape for providing the secondary display.*

*73. An apparatus according to claim 63, wherein the apparatus comprises a mobile handheld electronic device.*

*74. A computer program embodied on a non-transitory computer readable medium comprising computer executable program code which, when executed by at least one processor of an electronic apparatus comprising a surface that provides a main display and that folds over a border or an edge towards an outer edge of the apparatus forming a planar side surface that is sloped relative to the main display, the side surface providing a secondary display, causes the apparatus to perform:*

*operating the apparatus and controlling use of the main display and the secondary display.*

* * * * *